United States Patent
Whitton et al.

(10) Patent No.: US 8,443,688 B1
(45) Date of Patent: May 21, 2013

(54) METHOD OF LEARNING AN INITIAL CAPACITY POINT OF A CLUTCH IN A DUAL CLUTCH TRANSMISSION

(75) Inventors: Matthew D. Whitton, Howell, MI (US); Brandon E. Hancock, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/558,656

(22) Filed: Jul. 26, 2012

(51) Int. Cl.
*B60W 10/02* (2006.01)

(52) U.S. Cl.
USPC .............................................. 74/335; 477/174

(58) Field of Classification Search
USPC ..................................... 74/335; 477/166, 174
See application file for complete search history.

(56) References Cited

U.S. PATENT DOCUMENTS

| 2004/0172184 A1* | 9/2004 | Vukovich et al. | 701/51 |
| 2012/0137806 A1* | 6/2012 | Moorman et al. | 74/340 |
| 2012/0145504 A1* | 6/2012 | Moorman et al. | 192/3.58 |

\* cited by examiner

*Primary Examiner* — Ha D Ho
(74) *Attorney, Agent, or Firm* — Quinn Law Group, PLLC

(57) ABSTRACT

A method of learning an initial capacity point of a clutch in a dual clutch transmission includes identifying when the dual clutch transmission is operating in a steady state gear condition with a first clutch continuously transmitting torque to a first shaft. When the dual clutch transmission is operating in a steady state gear condition, a second clutch is sequentially positioned in each of a plurality of application positions ($P_n$, $P_{n+1}$, $P_{n+2}$, . . . , $P_{n+i}$). The second clutch is configured to transmit torque to a second shaft. The second shaft is positioned in a geared state in each of the plurality of application positions. The first application position ($P_{n+i}$) in the sequence of application positions in which the second shaft is not successfully positioned in the geared state is defined as the initial capacity point of the second clutch.

13 Claims, 2 Drawing Sheets

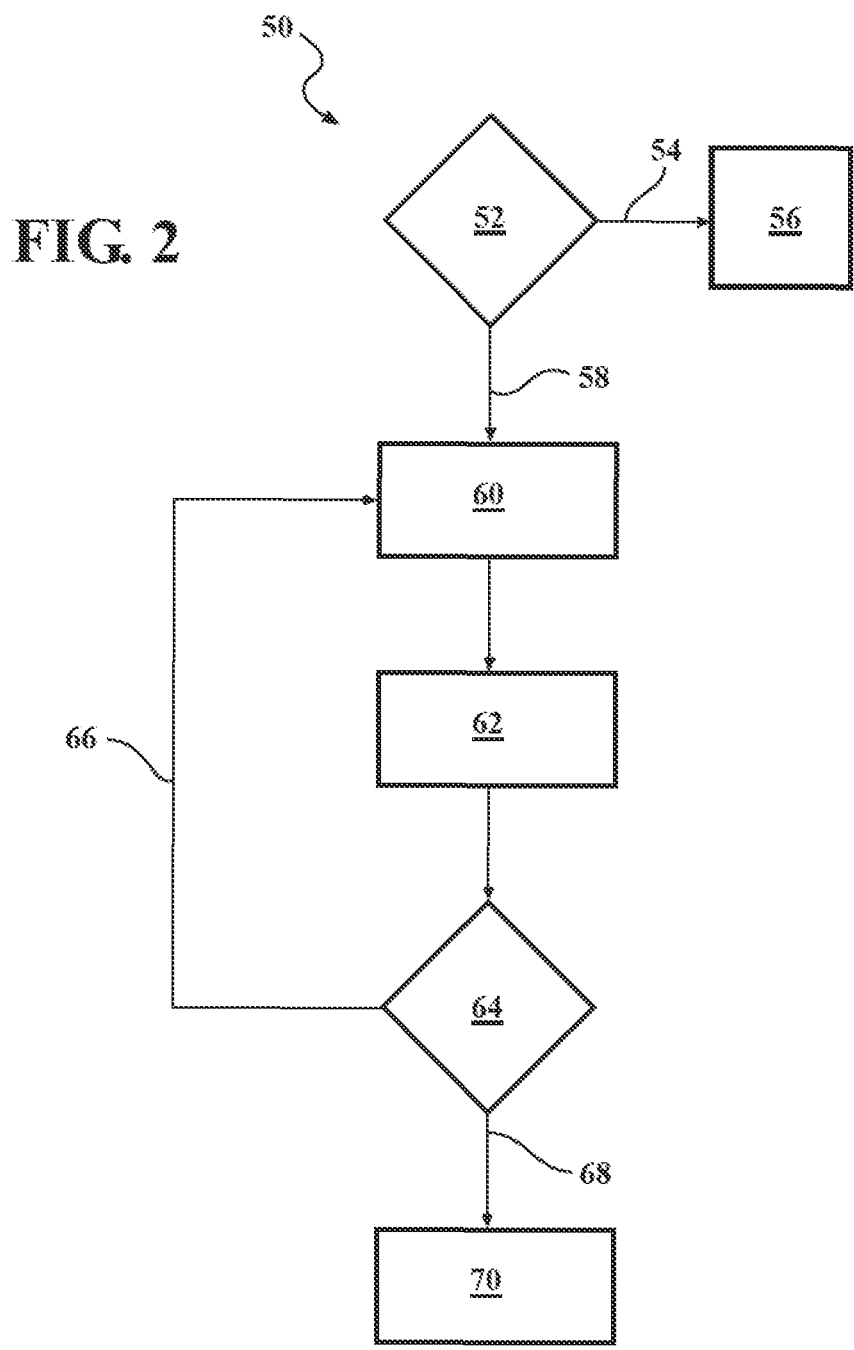

METHOD OF LEARNING AN INITIAL CAPACITY POINT OF A CLUTCH IN A DUAL CLUTCH TRANSMISSION

TECHNICAL FIELD

The invention generally relates to a method of learning an initial capacity point of a clutch in a dual clutch transmission of a vehicle.

BACKGROUND

A dual clutch transmission uses a first clutch to connect a first transmission shaft in torque transmitting communication with a crankshaft of an engine, and a second clutch to connect a second transmission shaft in torque transmitting communication with the crankshaft of the engine. One of the two clutches controls the even gears, while the other of the two clutches controls the odd gears. The first clutch and the second clutch operate independently. Sophisticated electronics and hydraulics control the engagement and disengagement of the first and second clutches. As one clutch is engaged, the other clutch is disengaged. Using this arrangement, gears can be changed without interrupting the power flow from the engine to the transmission.

In order to get fast responding, smooth operation from the first and second clutches, an electronic control module must know the initial capacity point of each of the first and second clutches. The initial capacity point is the position of the clutch at which the clutch just begins to transmit torque, i.e, a near zero torque. If the clutch is positioned just below the initial capacity point prior to being engaged, then the shift operation will be quick and predictable because the clutch will begin transmitting torque almost instantly upon being engaged. However, if the electronic control module does not know the initial capacity point, or if the previously known initial capacity point has changed or is incorrect, then the clutch may require additional time to engage, thereby delaying the shift operation.

SUMMARY

A method of learning an initial capacity point of a clutch in a dual clutch transmission of a vehicle is provided. The method includes identifying when the dual clutch transmission is operating in a steady state gear condition with a first clutch continuously transmitting torque to a first shaft. When the dual clutch transmission is operating in a steady state gear condition, a second clutch is sequentially positioned in each of a plurality of application positions ($P_n$, $P_{n+1}$, $P_{n+2}$, ..., $P_{n+i}$). The second clutch is configured to transmit torque to a second shaft. The second shaft is positioned in a geared state in each of the plurality of application positions. The first application position ($P_{n+i}$) in the sequence of application positions in which the second shaft is not successfully positioned in the geared state is defined as the initial capacity point of the second clutch.

A method of controlling a dual clutch transmission is also provided. The method includes identifying when the dual clutch transmission is operating in a steady state gear condition, with a first clutch continuously transmitting torque to a first shaft. A second clutch is sequentially positioned in each of a plurality of application positions ($P_n$, $P_{n+1}$, $P_{n+2}$, ..., $P_{n+i}$) when the dual clutch transmission is operating in a steady state gear condition. The second clutch is configured to transmit torque to a second shaft. The second shaft is positioned in a geared state in each of the plurality of application positions until the second shaft is not successfully positioned in the geared state condition. The first application position ($P_{n+i}$) in the sequence of application positions in which the second shaft is not successfully positioned in the geared state is defined as the initial capacity point of the second clutch. The second clutch is positioned in the defined initial capacity point prior to engaging the second clutch to transmit torque to the second shaft.

Accordingly, because a synchronizer of a dual clutch transmission can not index through a blocker ring to couple a gear to a shaft until there is very low or no torque on the shaft, the initial capacity point may be learned by incrementally increasing the position of the clutch until the synchronizer prevents the successful coupling of a gear to the second shaft, i.e., until the second shaft is not successfully positioned in the geared state. The second shaft fails to move into the geared state because the second clutch is transmitting torque to the second shaft. Accordingly, the first application position in which the second shaft does not successfully move into a geared state is the first application position in which the second clutch is transmitting torque to the second shaft, and is thereby defined as the initial capacity point.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a flowchart showing a method of learning an initial capacity point of a clutch of the dual clutch transmission.

DETAILED DESCRIPTION

Figure 1:
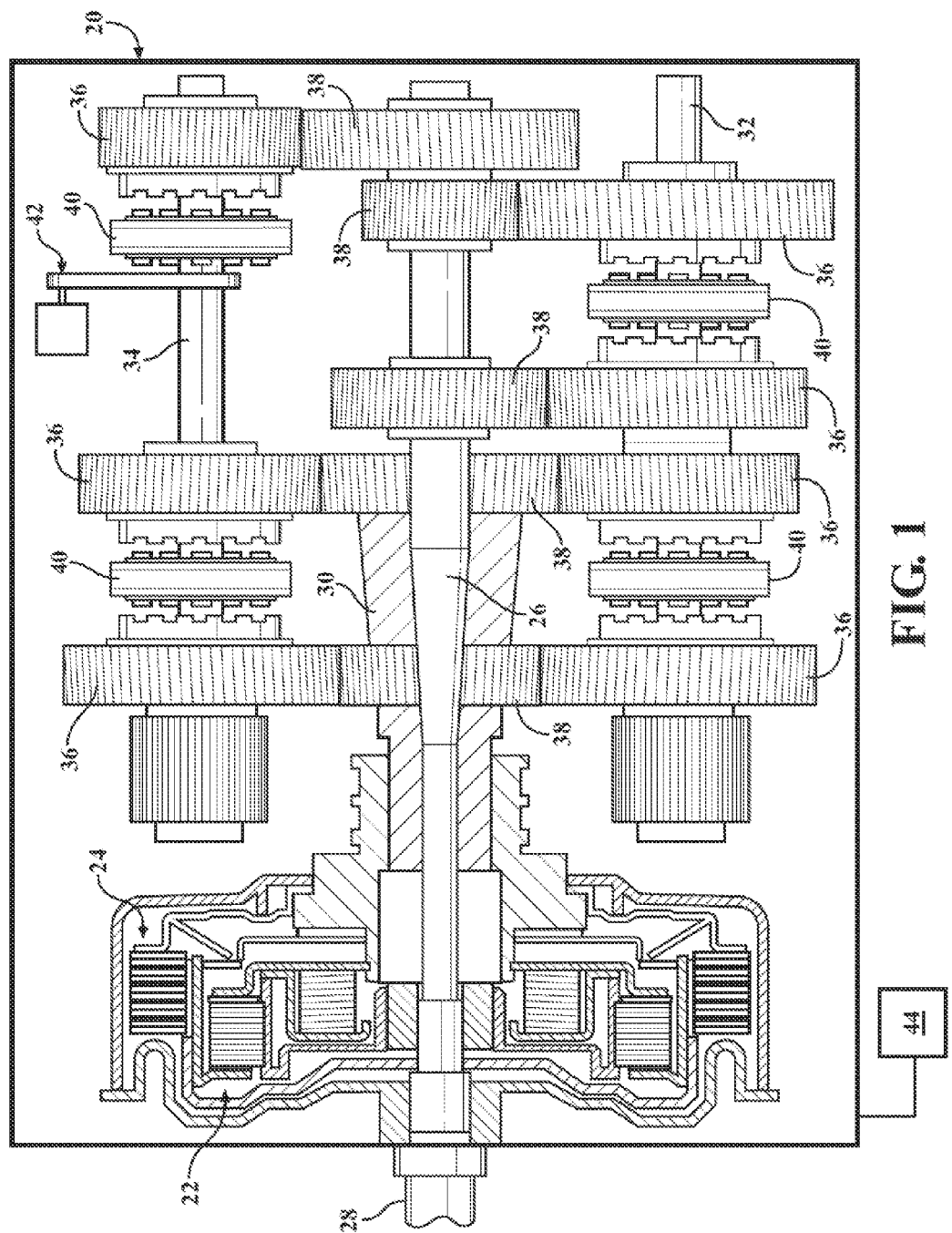
FIG. 1 is a schematic diagram of a dual clutch transmission.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a dual clutch transmission is generally shown at 20 in FIG. 1. The dual clutch transmission 20 includes a first clutch 22 and a second clutch 24. The first clutch 22 is coupled to a first transmission shaft 26, and selectively connects the first transmission shaft 26 to an output 28 of an engine (not shown). e.g., a crankshaft. The second clutch 24 is coupled to a second transmission shaft 30, and selectively connects the second transmission shaft 30 to the output 28 of the engine. The first clutch 22 and the second clutch 24 may include, for example, but are not limited to, a wet clutch or a dry clutch. When engaged, the first clutch 22 interconnects the first transmission shaft 26 with the output 28 of the engine to continuously transmit torque therebetween. When disengaged, the first clutch 22 disconnects the first transmission shaft 26 from the output 28 of the engine to disallow torque transmission therebetween. Similarly, when the second clutch 24 is engaged, the second clutch 24 interconnects the second transmission shaft 30 with the output 28 of the engine to continuously transmit torque therebetween. When disengaged, the second clutch 24 disconnects the first transmission shaft 26 from the output 28 of the engine to disallow torque transmission therebetween.

The first transmission shaft 26 may include either an inner transmission shaft or an outer transmission shaft, and the second transmission shaft 30 includes the other of the inner transmission shaft and the outer transmission shaft. The outer transmission shaft defines a hollow core, with the inner transmission shaft disposed therein and concentric with the outer transmission shaft as is known. FIG. 1 shows the first transmission shaft 26 as the inner transmission shaft, and the second transmission shaft 30 as the outer transmission shaft. However, it should be appreciated that the first transmission shaft 26 may alternatively be defined as the outer transmission shaft and the second transmission shaft 30 may be defined as the inner transmission shaft.

The dual clutch transmission 20 includes at least one layshaft 32, 34. As shown, the dual clutch transmission 20 includes a first layshaft 32 and a second layshaft 34. However, it should be appreciated that the dual clutch transmission 20 need only include one layshaft. Each of the first layshaft 32 and the second layshaft 34 include a plurality of layshaft gears 36 rotatably supported thereon, and in meshing engagement with one of a plurality of transmission shaft gears 38 disposed on one of the first transmission shaft 26 or the second transmission shaft 30. The dual clutch transmission 20 further includes a plurality of dog clutches 40. Each of the dog clutches 40 rotatably couples at least one of the layshaft gears 36 to one of the first layshaft 32 or the second layshaft 34 for torque transmitting rotation therewith. A shift mechanism 42, such as a shift fork, moves each of the dog clutches 40 into engagement with one of the gears. It should be appreciated that while only one shift mechanism 42 is shown for clarity, the dual clutch transmission 20 may include multiple shift mechanisms 42 to move the various dog clutches 40.

A synchronizer (not shown) is incorporated into each dog clutch 40, and prevents the dog clutch 40 from rotatably coupling the dog clutch 40 to one of the first layshaft 32 or the second layshaft 34 in the presence of a torque difference therebetween. In other words, the synchronizer prevents the dog clutch 40 from rotatably coupling the layshaft gear 36 to one of the first layshaft 32 or the second layshaft 34 when torque is present. In order for the synchronizer to couple the layshaft gear 36 to one of the first layshaft 32 or the second layshaft 34, the synchronizer must mechanically index or move a blocker ring (not shown) into a defined position. The synchronizer is able to index and move the blocker ring in the absence of a torque differential between the layshaft gear 36 and the second transmission shaft 30, when the second clutch 24 is not transmitting torque to the second transmission shaft 30. The synchronizer is unable to index and move the blocker ring in the presence of a torque differential between the layshaft gear 36 and the second transmission shaft 30, when the second clutch 24 is transmitting torque to the second transmission shaft 30.

The dual clutch transmission 20 may include a control module 44, such as but not limited to a transmission control unit, to control the operation of the dual clutch transmission 20. The control module 44 may include a computer and/or processor, and include all software, hardware, memory, algorithms, connections, sensors, etc., necessary to manage and control the operation of the drivetrain. As such, a method, described below and generally shown in FIG. 2 at 50, may be embodied as a program operable on the control module 44. It should be appreciated that the control module 44 may include any device capable of analyzing data from various sensors, comparing data, making the necessary decisions required to control the operation of the dual clutch transmission 20, and executing the required tasks necessary to control the operation of the dual clutch transmission 20.

In order to get fast responding, smooth operation from the first clutch 22 and the second clutch 24, the electronic control module 44 must know the initial capacity point of each of the first clutch 22 and the second clutch 24 respectively. The initial capacity point is the position of the clutch at which the clutch just begins to transmit torque, i.e, a near zero torque. Accordingly, the method of learning the initial capacity point of one of the first clutch 22 and the second clutch 24 in the dual clutch transmission 20 is provided and described below. While the method is described below as learning the initial capacity point of the second clutch 24 when the first clutch 22 is continuously transmitting torque to the first transmission shaft 26, it should be appreciated that the method may be applied to learn the initial capacity point of the first clutch 22 when the second clutch 24 is continuously transmitting torque to the second transmission shaft 30.

The method includes providing the control module 44 that is operable to control the operation of the dual clutch transmission 20. As noted above, the control module 44 includes all software, hardware, memory, algorithms, connections, sensors, etc. necessary to manage and control the operation of the dual clutch transmission 20. The control module 44 is operable to perform the various tasks of the method described below.

Referring to FIG. 2, the control module 44 identifies or determines when the dual clutch transmission 20 is operating in a steady state gear condition, represented by box 52, with the first clutch 22 continuously transmitting torque to the first transmission shaft 26. The steady state gear condition is defined herein to include an operating condition in which the dual clutch transmission 20 is continuously operating in a single gear ratio without accelerating, decelerating, or shifting gear ratios. The control module 44 may determine the operating condition in any suitable manner, such as by monitoring a speed and/or acceleration of the vehicle.

If the control module 44 determines that the dual clutch transmission 20 is not operating in a steady state gear condition, indicated at 54, then no further action is taken, represented by box 56. When the control module determines that the dual clutch transmission 20 is operating in a steady state gear condition, indicated at 58, then the second clutch 24 is sequentially positioned in each of a plurality of application positions ($P_n$, $P_{n+1}$, $P_{n+2}$, ..., $P_{n+i}$), represented by box 60. Sequentially positioning the second clutch 24 includes moving the second clutch 24 from a fully disengaged position into a fully engaged position through a plurality of intermediate application positions in sequence. The intermediate position ($P_i$) of the sequence in which the second clutch 24 begins to transmit torque is the initial capacity point of the second clutch 24. Accordingly, it should be appreciated that the second clutch 24 does not transmit torque between the output 28 of the engine and the second transmission shaft 30 when positioned in the previous intermediate position ($P_{i-1}$) of the sequence.

When the second clutch 24 is positioned in each of the plurality of intermediate application positions, the control module 44 attempts to position the second transmission shaft 30 in a geared state in each of the plurality of application positions, represented by box 62. The control module 44 then determines if the second transmission shaft 30 was successfully positioned in a geared state, or was not successfully positioned in a geared state, represented by box 64. As noted above, the synchronizer for each dog clutch 40 prevents the dog clutch 40 from coupling the associated layshaft gear 36 to the second transmission shaft 30 if any torque is present. As such, the dog clutch 40 may only couple the associated layshaft gear 36 to the second transmission shaft 30 when no torque is present. Therefore, if the dog clutch 40 successfully positions the second transmission shaft 30 in a geared state, i.e., if the dog clutch 40 successfully couples the associated layshaft gear 36 to the second transmission shaft 30 for torque transmission therebetween, indicated at 66, then the control module 44 may determine that little or no torque difference is present therebetween. If however, the dog clutch 40 is unsuccessful in positioning the second transmission shaft 30 in a geared state, i.e., if the dog clutch 40 unsuccessfully or fails to couple the associated layshaft gear 36 to the second transmission shaft 30 for torque transmission therebetween, indicated at 68, then the control module 44 may determine that a torque differential is present between the gear and the second transmission shaft 30, and that the second clutch 24 is transmitting torque to the second transmission shaft 30.

Accordingly, for each intermediate application position of the second clutch 24, the control module 44 attempts to position the second transmission shaft 30 into a geared state. If the control module 44 is successful in positioning the second transmission shaft 30 into a geared state, indicated at 66, then the control module 44 moves the second clutch 24 into the next position in the sequence of intermediate application positions, represented by box 60, and again attempts to position the second transmission shaft 30 into the geared state. The control module 44 follows this procedure until the second transmission shaft 30 is not successfully positioned in the geared state condition, indicated at 58, at which time the control module 44 may determine that the second clutch 24 is transmitting torque to the second transmission shaft 30.

The successful or unsuccessful positioning of the second transmission shaft 30 in the geared condition may be determined in any suitable manner. For example, the control module 44 may monitor a position of the shift mechanism 42 to determine if the second transmission shaft 30 is successfully positioned in the geared state for each of the plurality of intermediate application positions, or is not successfully positioned in the geared state for each of the plurality of intermediate application positions.

As noted above, the first application position ($P_{n+i}$) in the sequence of intermediate application positions in which the second transmission shaft 30 is not successfully positioned in the geared state may be defined as the initial capacity point of the second clutch 24, represented by box 70. The control module 44 may then position the second clutch 24 in the defined initial capacity point just prior to engaging the second clutch 24 to transmit torque to the second transmission shaft 30, thereby providing fast and consistent engagement of the second clutch 24, which improves the performance of the dual clutch transmission 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of learning an initial capacity point of a clutch in a dual clutch transmission of a vehicle, the method comprising:
   identifying when the dual clutch transmission is operating in a steady state gear condition with a first clutch continuously transmitting torque to a first shaft;
   sequentially positioning a second clutch in each of a plurality of application positions ($P_n$, $P_{n+1}$, $P_{n+2}$, ..., $P_{n+i}$) when the dual clutch transmission is operating in a steady state gear condition, wherein the second clutch is configured to transmit torque to a second shaft;
   attempting to position the second shaft in a geared state in each of the plurality of application positions; and
   defining the first application position ($P_{n+i}$) in the sequence of application positions in which the second shaft is not successfully positioned in the geared state as the initial capacity point of the second clutch.

2. A method as set forth in claim 1 further comprising monitoring a position of a shift fork to determine if the second shaft is successfully positioned in the geared state for each of the plurality of application positions, or is not successfully positioned in the geared state for each of the plurality of application positions.

3. A method as set forth in claim 1 wherein sequentially positioning the second clutch is further defined as sequentially moving the second clutch from a fully disengaged position into a fully engaged position through a plurality of intermediate application positions.

4. A method as set forth in claim 1 wherein attempting to position the second shaft in the geared state condition includes engaging a synchronizer to mechanically index and move a blocker ring, wherein the synchronizer is able to index and move the blocker ring in the absence of torque transmission through the second clutch, and wherein the synchronizer is unable to index and move the blocker ring in the presence of torque transmission through the second clutch.

5. A method as set forth in claim 1 wherein attempting to position the second shaft in the geared state condition is further defined as attempting to position the second shaft in the geared state condition until the second shaft is not successfully positioned in the geared state condition.

6. A method as set forth in claim 1 further comprising positioning the second clutch in the defined initial capacity point prior to engaging the second clutch to transmit torque to the second shaft.

7. A method as set forth in claim 1 further comprising providing a control module including all hardware and software necessary to identify when the dual clutch transmission is operating in a steady state gear condition, sequentially position the second clutch in each of the plurality of application positions, position the second shaft in a geared state, define the initial capacity point, and save the initial capacity point in memory for future applications of the second clutch.

8. A method as set forth in claim 1 wherein the first shaft includes either an inner transmission shaft or an outer transmission shaft, and the second shaft includes the other of the inner transmission shaft or the outer transmission shaft.

9. A method of controlling a dual clutch transmission, the method comprising:
   identifying when the dual clutch transmission is operating in a steady state gear condition with a first clutch continuously transmitting torque to a first shaft;
   sequentially positioning a second clutch in each of a plurality of application positions ($P_n$, $P_{n+1}$, $P_{n+2}$, ..., $P_{n+i}$) when the dual clutch transmission is operating in a steady state gear condition, wherein the second clutch is configured to transmit torque to a second shaft;
   attempting to position a second shaft in a geared state in each of the plurality of application positions until the second shaft is not successfully positioned in the geared state condition;
   defining the first application position ($P_{n+i}$) in the sequence of application positions in which the second shaft is not successfully positioned in the geared state as the initial capacity point of the second clutch; and
   positioning the second clutch in the defined initial capacity point prior to engaging the second clutch to transmit torque to the second shaft.

10. A method as set forth in claim 9 further comprising monitoring a position of a shift fork to determine if the second shaft is successfully positioned in the geared state for each of the plurality of application positions, or is not successfully positioned in the geared state for each of the plurality of application positions.

11. A method as set forth in claim 9 wherein sequentially positioning the second clutch is further defined as sequentially moving the second clutch from a fully disengaged position into a fully engaged position through a plurality of intermediate application positions.

12. A method as set forth in claim 9 wherein attempting to position the second shaft in the geared state condition includes engaging a synchronizer to mechanically index and move a blocker ring, wherein the synchronizer is able to index and move the blocker ring in the absence of torque transmission through the second clutch, and wherein the synchronizer is unable to index and move the blocker ring in the presence of torque transmission through the second clutch.

13. A method as set forth in claim 9 further comprising providing a control module coupled to the dual clutch transmission and including all hardware and software necessary to:
   identify when the dual clutch transmission is operating in a steady state gear condition,
   sequentially position the second clutch in each of the plurality of application positions,
   position the second shaft in a geared state,
   define the initial capacity point, and
   save the initial capacity point in memory for future applications of the second clutch.

* * * * *